Patented Nov. 2, 1943

2,333,568

UNITED STATES PATENT OFFICE 2,333,568

EXTRACTION OF HYDROCARBON SULPHONYL CHLORIDES

Clyde O. Henke, Wilmington, Del., and Frank McGrew Schofield, Woodstown, N. J., assignors to E. I. du Pont de Nemours & Company, Wilmington, Del., a corporation of Delaware No Drawing. Application September 19, 1939, Serial No. 295,694

2 Claims. (Cl. 204—163)

This invention relates to the manufacture of improved surface active agents from the interaction of hydrocarbon-containing materials, sulphur dioxide and chlorine and hydrolysis and neutralization of the sulphonyl chlorides. More particularly it relates to a process for producing surface active agents having improved wetting, sudsing, and deterging properties from non-gaseous saturated hydrocarbons, especially aliphatic hydrocarbons by interaction with admixed sulphur dioxide and chlorine.

This invention has for an object the production of surface active products having enhanced wetting, sudsing, and deterging properties from aforesaid reaction in an economical manner. A further object is to provide an economical and effective method of removing sulphonyl chloride derivatives resulting from the unreacted and other components. A still further object is to reduce the overall cost of producing effective detergents from saturated aliphatic hydrocarbons, sulphur dioxide and chlorine. Other objects will appear hereinafter or will be apparent from the following description.

The above objects are obtained by the following invention which comprises in its broader aspects reacting a hydrocarbon containing compound in the liquid phase with admixed sulphur dioxide and chlorine and removing the sulphonyl chlorides formed by extraction with liquid sulphur dioxide. The sulphur dioxide may then be removed by volatilization and the sulphonyl chlorides reacted to form derivatives thereof. The remaining material which is insoluble in the solvent is returned to the reaction zone where it may be admixed with additional hydrocarbons.

In a more preferred form of the invention non-gaseous saturated aliphatic or cycloaliphatic hydrocarbons including pure hydrocarbons or mixtures are reacted with admixed gaseous sulphur dioxide and chlorine until less than 60% and preferably from 10 to 50% of the hydrocarbon material has reacted to form hydrocarbon sulphonyl chlorides. The hydrocarbon sulphonyl chlorides are removed from the remaining material by extracting with a solvent therefor, and the solvent removed. The sulphonyl chlorides which are predominately hydrocarbon monosulphonyl chlorides free from chlorine attached to carbon atoms are then hydrolyzed to sulphonic acids. If an alkali metal base is used as the hydrolysis medium the alkali metal sulphonates are formed.

In a still more preferred embodiment of the invention the reaction is carried out at temperatures between −20 and +20° C. in the presence of actinic light until 10 to 50% of the hydrocarbon has reacted. Temperatures as low as 40° C. may be used if the hydrocarbon used is liquid or can be maintained in intimate contact with the sulphur dioxide and chlorine. The reaction may be run in liquid $SO_2$ with liquid and/or gaseous chlorine. The hydrocarbon sulphonyl chlorides are then hydrolized and neutralized with concentrated alkali metal hydroxide solutions to the corresponding sulphonates.

The sulphonates may be suitably worked up into a solution or drum dried to form a solid flake, spray dried, or by any other suitable method.

The invention will be more fully understood but is not intended to be limited by the following examples wherein the parts stated are parts by weight:

EXAMPLE I

A petroleum white oil boiling between 265–306° C., which is substantially free from olefinic and aromatic constituents consisting essentially of paraffinic hydrocarbons, and having a specific gravity of 0.803 at 15.5° C. was treated with a gaseous mixture of sulphur dioxide and chlorine at a temperature of 45° in the presence of light from a "Photoflood" bulb until the specific gravity increased to 0.875 at 45° which represents the reaction of about 25% of the hydrocarbons. Five hundred parts of this mixture was extracted with two successive portions of an equal volume of liquid sulphur dioxide. There remained 348 parts of the mixture which was insoluble in the liquid sulphur dioxide. When the sulphur dioxide was evaporated from the extracted portions there was left a residue of 99 parts from the first extraction and 46 parts from the second which is a total of 145 parts or 29% of the original mixture. The extractions were combined and 100 parts of this mixture of sulphonyl chlorides was hydrolyzed with 86.5 parts of 30% aqueous sodium hydroxide at 90–100° C. The crude hydrolyzed mass was diluted with 3 volumes of water and ⅓ as much ethyl alcohol as water by volume. After adjusting the alkalinity so that the solution was just alkaline to phenolphthalein, the solution was warmed to 60° and put in a separatory funnel. On standing only a very small quantity of an oily emulsion separated on top. The aqueous solution possessed superior wetting and detergent properties.

EXAMPLE II

Six hundred grams of a Pennsylvania petroleum white oil boiling between 265–306° C., substantially free from olefinic and aromatic constituents and consisting essentially of paraffinic hydrocarbons, was treated witah a gaseous mixture of sulphur dioxide and chlorine at a temperature of −5° C. The reaction flask was illuminated by the light from a 150 watt incandescent lamp with a silvered reflector to focus the light. 102 parts of sulphur dioxide and 83 parts of chlorine were passed into the reaction flask during a period of twenty-one minutes. The reaction mass gained 99 g. in weight. The mass then was extracted twice with 700 cc. of liquid sulphur dioxide and once with 350 cc. of liquid sulphur dioxide. The insoluble portion weighed 496 g. and when the sulphur dioxide was evaporated from the combined extracted portions, 192 g. of sulphonyl chlorides of the starting hydrocarbon was recovererd. The sulphonyl chloride portion was hydrolyzed to the sodium sulphonate with 190 g. of 30% aqueous sodium hydroxide at 90–95° C. The crude hydrolyzed mass was diluted with 708 cc. of water and 71 cc. of ethyl alcohol, warmed to 60°, and let stand in a separatory funnel. No oil layer separated from the solution as always happens when the sulphur dioxide-chlorine-hydrocarbon reaction is not extracted before hydrolysis. To 914 g. of this solution was added 211 g. of sodium sulphate and the mixture was drum dried to yield 340 g. of a white flaky product analyzing 35% alkyl sodium sulphonate.

The unreacted oil, which was insoluble in the liquid sulphur dioxide, was then subjected to further reaction with gaseous sulphur dioxide and chlorine, extracted as before, and the extract worked up as above. The unreacted oil from this step was again further reacted. This procedure was carried out a total of five times. The amounts involved are given in the following table:

*Partial reaction and extraction*

| Experiment | Weight | Gain from $SO_2Cl_2$ mixture | Weight unreacted oil | Weight of extracted portion | Liquid $SO_2$ |
|---|---|---|---|---|---|
| | Grams | Grams | Grams | Grams | Cubic centimeters |
| A | 600 | 99 | 496 | 192 | 1,750 |
| B | 496 | 84 | 366 | 202 | 1,160 |
| C | 366 | 61 | 236 | 190 | 860 |
| D | 236 | 40 | 123 | 154 | 900 |
| E | 123 | 21 | 82 | 67 | 300 |

Each of the sulphonyl chloride extracts was hydrolyzed, worked up, and drum dried as described above. The products were found to be approximately equal in wetting, sudsing, and detergent properties.

Example III

Three hundred grams of the Pennsylvania white oil used in Example II was treated with a gaseous mixture of sulphur dioxide and chlorine at a temperature of approximately 0° C. and in the presence of light from the 150 watt incandescent bulb mentioned in Example II. The gases were passed until the oil gained 50 g. It was then extracted with three portions of 175 cc. of liquid sulphur dioxide. The unreacted oil which was insoluble in liquid sulphur dioxide was made up to 300 g. with fresh oil and the procedure repeated. This was carried out twelve times, approximately 110–115 g. of sulphur dioxide soluble sulphonyl chlorides and 225–230 g. of unreacted oil being obtained each time. The sulphur dioxide was evaporated from the extracted portions and the portions were combined.

One hundred grams of the sulphonyl chlorides thus obtained was hydrolyzed with 54 grams of 50% sodium hydroxide at about 90° C. in a vessel provided with an agitator. Heating was continued until the mass became rather stiff. Then 34 g. of anhydrous borax was added and then after milling until homogeneity was attained, 12 g. of sodium acid sulphate was added and 175 g. of sodium sulphate. Agitation was continued under a vacuum while heating until water ceased distilling off. The mixture was then cooled while agitating until a powder was formed. The product was an excellent wetting, sudsing, and detersive agent.

Example IV

An apparatus was arranged for carrying out the reaction continuously with simultaneous extraction with liquid sulphur dioxide. A column was set vertically and a layer of liquid sulphur dioxide put in the bottom and a layer of a petroleum white oil was put on top of it. Gaseous chlorine was introduced so that it bubbled through the sulphur dioxide and thus carried a mixture of sulphur dioxide and chlorine up into the oil layer. Oil and liquid sulphur dioxide were introduced at the top of the oil layer. The sulphur dioxide solution of sulphonyl chloride was withdrawn from the bottom. The whole was kept at a temperature of about −17° C. by maintaining a vacuum of about five inches of mercury on the system. Actinic light was provided by illuminating the oil layer with the light from a 150 watt electric light. Into this system was passed 72 g. of the petroleum white oil and 3150 cc. of liquid sulphur dioxide over a period of one hour and forty minutes. The resulting sulphur dioxide solution was drawn off, the sulphur dioxide evaporated and the sulphonyl chlorides were hydrolyzed and drum dried as in Example II. The product was an excellent wetting agent.

The invention is not limited to the use of sulphur dioxide as an extracting agent although that compound gives the best results and has the additional advantage that it does not introduce an impurity into the system. In general, there may be used as solvents those which are useful in the solvent refining of petroleum where the refined petroleum consists essentially of paraffinic and naphthenic constituents. Suitable additional solvents include nitrobenzene, phenol and furfural. Other solvents which preferably have a boiling point below 100° C. may be used.

The use of sulphur dioxide as a solvent may be carried out under pressure to facilitate the operation or may be carried out under a vacuum in order to obtain lower temperatures which are obtained by the exaporation of the sulphur dioxide. The sulphur dioxide evaporated during the operation of the extraction step and recovery of the sulphonyl chloride can be compressed and reintroduced into the system so that losses of sulphur dioxide are negligible.

The extraction step may be carried out batchwise or it may be carried out continuously by counter-current extraction of the sulphonyl chloride-hydrocarbon mixture in any of the conventional methods. This continuous extraction step may be carried out with a continuous process of forming the sulphonyl chlorides such as is disclosed in the copending application of Lockwood and Richmond, Serial No. 216,843, now U. S. Patent 2,193,824.

On the other hand the simultaneous sulphonation and extraction as illustrated in Example IV may be carried out under vacuum, at atmospheric pressure, or under super-atmospheric pressure as desired, thus accomplishing the reaction and extraction in one piece of equipment instead of two.

The batch-wise extraction is very convenient for separating the sulphonyl chloride from the unreacted oil when hydrocarbon monosulphonates are particularly desired. These products may be obtained by employing the conditions set forth in Henke & Lockwood application entitled Chemical products and processes of making the same, filed on an even date herewith, Serial No. 295,695. By varying the rates of feed of hydrocarbon, sulphur dioxide, and chlorine, the continuous and simultaneous sulphonation and extraction may be caused to yield a product which predominates in monosulphonates.

The reaction may be carried out using a wide range of proportion of reactants. The sulphur dioxide may be less than the amount of chlorine but for most purposes from the standpoint of good wetting, sudsing and deterging properties is preferably in excess. A ratio of 1.5 to 20 mols of sulphur dioxide per mol of chlorine represents a practical range and a range of 2 to 6 mols of sulphur dioxide to 1 mol of chlorine a preferred range. A ratio of 2.5 to 3.5 of sulphur dioxide to 1 mol of chlorine represents a range whereby very good results are obtained.

As will be apparent from the above it is not necessary that each of the inorganic reactants be in the vapor phase; on the contrary one or both of these reactants may be wholly or partly in the liquid phase.

While the above examples are all directed to the use of Pensnylvania white oil the invention hereof is not limited to this hydrocarbon but is of general utility and may be applied to various other hydrocarbons and hydrocarbon containing materials, that is, compounds containing a saturated hydrocarbon radical especially one of at least 8 carbon atoms. The compounds reacted are preferably free from olefinic and acetylenic linkages and aromatic radicals. Thus, it may be used not only with petroleum oils and waxes but with pure aliphatic or cycloaliphatic hydrocarbons. Suitable specific compounds include n-alkanes having from 5 to 24 carbon atoms, iso-alkanes of 5 to 24 carbon atoms, naphthenes of 8 to 24 carbon atoms, cyclohexane, dodecyl cyclohexane, decahydronaphthalene, camphane, pinane, abietane, paraffin wax, scale wax, match wax, wax drippings, etc. Hydrocarbons obtainable by catalytic hydrogenation of the oxides of carbon and the hydrogenation of coal, etc., may be used.

Other sources of actinic light may be used to irradiate or illuminate the reaction zone. Suitable sources include mercury vapor, mercury arc, rare gas lamps, carbon arcs, metal cored and metal salt cored carbon arcs, light from spark gaps, direct sunlight, etc. In general a light rich in the wave lengths which activate the chlorine molecule or atom including short waved light below 4500° A. is desirable.

The hydrolysis reaction is not limited to the specific examples set forth above. For instance, the concentration of caustic soda used for hydrolyzing the reaction product obtained by treating hydrocarbons with a gaseous mixture of sulphur dioxide and chlorine may be varied from 5% to 50%. The reaction is somewhat slower with the more dilute caustic soda solutions and almost instantaneous with the more concentrated solutions. Other alkali metal hydroxides such as potassium, caesium, etc., may be used. Likewise, the alkaline earth hydroxides and oxides may be employed. An aqueous solution of ammonium hydroxide may be used to yield the ammonium salt. Substituted ammonium salts or amines salts may be obtained by hydrolyzing the product with aqueous solutions of aliphatic, cycloaliphatic, aromatic, and heterocyclic amines, such as dimethylamine, ethylamine, diethylamine and triethanolamine, piperidine, diethyl-cyclohexylamine, pyridine, aniline, toludine, xylidines, $\beta$-naphthyl amine, etc. Thus, the amine salts of hydrocarbon sulphonic acid may be obtained. Also the strong quaternary ammonium bases such as tetra-methyl-ammonium-hydroxide and tetra-ethyl-ammonium-hydroxide may be used for the hydrolysis. The resulting products would be the tetra-methyl-ammonium salt or the tetra-ethyl-ammonium salt of a hydrocarbon sulphonic acid.

Water-miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol and its ethers and esters, e. g., ethylene glycol, diethyl ether, dimethyl ether, etc.

In addition to the salts mentioned above for admixture with the surface active products may be other water soluble salts such as calcium chloride, magnesium sulphate, sodium bromide, sodium iodide, sodium chloride, sodium phosphate, (mono-, di- and tri-basic) sodium pyrophosphate, sodium hexametaphosphate, sodium perborate, sodium bisulphite and sodium silicate. As well as the sodium salt, there can be employed the corresponding potassium, ammonium and quaternary ammonium salts; while the inorganic salts are preferred, organic salts such as sodium acetate, benzoate, formate, lactate, malate, citrate, and tartrate, may also be used.

The hydrolysis products or water-soluble salts of the above-described sulphonyl chlorides which have surface-active properties may be used in admixture with one another and/or in admixture with soap and/or soap substitutes of the prior art, for various purposes wherein soap and/or soap substitutes have previously been used or are capable of use. A few representative uses are set forth in Reed application, Ser. No. 216,332, and it is to be understood that the products produced according to this invention may be substituted in like amount for the products of each of the examples of that case.

The invention has a number of uses and advantages in that it enables one to produce hydrocarbon monosulphonyl chlorides essentially free from combined chlorine attached to carbon atoms and/or other sulphonyl chloride groups in a practical manner. A further advantage resides in the fact that products of enhanced surface active properties may be obtained.

By removing the sulphonyl chlorides from the unreacted hydrocarbon it is possible to hydrolyze them in more concentrated solutions which means economies of drying are effected. Since it is not necessary to dilute the hydrolyzed mass with water to remove unreacted oil, further savings in drying are effected as less water has to be removed.

An additional advantage of the invention resides in the fact that when sulphonyl chlorides are hydrolyzed on the acid side, for example, in the presence of a sufficient amount of the sulphonate to emulsify the sulphonyl chloride, very concentrated solutions and essentially salt-free solids may be obtained.

As many apparently widely different embodiments of the invention may be made without departing from the spirit and scope thereof, it is to be understood we do not intend to limit ourselves to the specific embodiments herein except as defined by the appended claims.

We claim:

1. The process which comprises maintaining a body of liquid sulphur dioxide in a vertical column, maintaining on said body a liquid layer of a saturated aliphatic hydrocarbon of 8 to 22 carbon atoms, continuously passing upwardly into the layer of hydrocarbon a gaseous mixture of sulphur dioxide and chlorine while irradiating with actinic light, continuously passing liquid sulphur dioxide downwardly through the hydrocarbon layer, continuously adding hydrocarbon to the hydrocarbon layer to replace that removed by reaction with sulphur dioxide and the chlorine to form hydrocarbon sulphonyl chlorides followed by dissolution in said downwardly moving liquid sulphur dioxide, continuously withdrawing a liquid sulphur dioxide solution of hydrocarbon sulphonyl chlorides from the bottom of the column, and recovering the hydrocarbon sulphonyl chlorides by evaporating the sulphur dioxide.

2. The process which comprises maintaining a body of liquid sulphur dioxide in a vertical column, maintaining a layer of a petroleum white oil on said body, continuously bubbling gaseous chlorine through the body of liquid sulphur dioxide whereby a mixture of sulphur dioxide and chlorine are carried up into the oil layer, continuously adding liquid sulphur dioxide and oil to the oil layer while irradiating said layer with actinic light, continuously withdrawing a liquid sulphur dioxide solution of hydrocarbon sulphonyl chlorides from the bottom of said column, and evaporating the sulphur dioxide from the solution.

CLYDE O. HENKE.
FRANK McGREW SCHOFIELD.